(12) United States Patent
Niu et al.

(10) Patent No.: US 11,932,170 B2
(45) Date of Patent: Mar. 19, 2024

(54) SWITCHABLE MIRROR AND DISPLAY

(71) Applicant: GENTEX CORPORATION, Zeeland, MI (US)

(72) Inventors: Xiaoxu Niu, Grand Rapids, MI (US); David J. Cammenga, Zeeland, MI (US); William L. Tonar, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 456 days.

(21) Appl. No.: 17/076,319

(22) Filed: Oct. 21, 2020

(65) Prior Publication Data
US 2021/0114524 A1 Apr. 22, 2021

Related U.S. Application Data

(60) Provisional application No. 62/923,767, filed on Oct. 21, 2019.

(51) Int. Cl.
*B60R 1/12* (2006.01)
*B60R 1/02* (2006.01)
(Continued)

(52) U.S. Cl.
CPC .............. *B60R 1/12* (2013.01); *B60R 1/02* (2013.01); *G02F 1/0136* (2013.01);
(Continued)

(58) Field of Classification Search
CPC . B60R 1/12; B60R 1/02; G02F 1/0136; G02F 1/133308
See application file for complete search history.

(56) References Cited

U.S. PATENT DOCUMENTS 7,502,156 B2   3/2009  Tonar
9,637,054 B2   5/2017  Vanderploeg
(Continued)

OTHER PUBLICATIONS

International Search Report dated Feb. 4, 2021, for correspondence PCT application No. PCT/US2020/056640, 2 pages.
(Continued)

*Primary Examiner* — Lucy P Chien
(74) *Attorney, Agent, or Firm* — Price Heneveld LLP; Brian James Brewer (57) ABSTRACT

An improved device switchable between reflective and display states comprising an optical element and a display element. The optical element comprising a liquid crystal medium disposed between first and second substrates. The optical element may further comprise a first electrode, a second electrode, an absorptive polarizer, and a reflective polarizer. The first electrode and the absorptive polarizer may be disposed in a first direction relative the liquid crystal medium. Similarly, the second electrode and the reflective polarizer may be disposed in a second direction relative the liquid crystal medium. The second direction is opposite the first direction. In some embodiments, one or more of the absorptive and reflective polarizers may be further disposed between the first and second substrates. The display may be disposed in the first direction relative the optical element. Additionally, the device may further comprise a housing. In some embodiments, the housing may not have a bezel.

20 Claims, 9 Drawing Sheets

(51) Int. Cl.
*G02F 1/01* (2006.01)
*G02F 1/1333* (2006.01)
*G02F 1/1335* (2006.01)
*G02F 1/1343* (2006.01)
*G02F 1/137* (2006.01)

(52) U.S. Cl.
CPC .. *G02F 1/133308* (2013.01); *G02F 1/133536* (2013.01); *G02F 1/134309* (2013.01); *G02F 1/137* (2013.01); *B60R 2001/1215* (2013.01)

(56) References Cited

U.S. PATENT DOCUMENTS

| | | |
|---|---|---|
| 9,834,146 B2 | 12/2017 | Vanderploeg |
| 10,434,948 B2 | 10/2019 | Tonar |
| 2005/0007645 A1* | 1/2005 | Tonar .................... G02F 1/1533 359/265 |
| 2005/0057701 A1* | 3/2005 | Weiss ................ G02B 27/0101 349/10 |
| 2005/0195488 A1* | 9/2005 | McCabe ................ G02B 5/085 359/603 |
| 2016/0193963 A1 | 7/2016 | Anderson et al. |
| 2017/0068143 A1 | 3/2017 | Bruizeman et al. |
| 2017/0088055 A1* | 3/2017 | Cammenga ............ G02F 1/157 |
| 2018/0299728 A1 | 10/2018 | Tonar |
| 2019/0163013 A1 | 5/2019 | Cammenga |

OTHER PUBLICATIONS

Written Opinion dated Feb. 4, 2021, for correspondence PCT application No. PCT/US2020/056640, 5 pages.

\* cited by examiner

SWITCHABLE MIRROR AND DISPLAY

CROSS-REFERENCE TO RELATED APPLICATIONS

This application claims priority under 35 U.S.C. § 119(e) to U.S. Provisional Application No. 62/923,767 filed on Oct. 21, 2019, entitled "SWITCHABLE MIRROR AND DISPLAY," the disclosure of which is hereby incorporated by reference in its entirety.

FIELD OF INVENTION

The present invention generally relates to a rearview assembly and, more particularly, to a rearview assembly with an electronic display.

BACKGROUND OF INVENTION

Vehicles typically include one or more rearview assemblies to allow a driver of a vehicle to observe an area behind the vehicle. These rearview assemblies traditionally accomplish this through the use of a mirror. However, some rearview assemblies comprise a display element in addition to the mirror element. Mirrors using an electronic display element typically rely on a series of polarizers. In some configurations, a polarizer is disposed on the front surface of the mirror element. However, this placement of a polarizer often necessitates a bezel to protect the edge of the polarizer from peeling and/or contaminants, like water, getting there behind. The downside of the bezel is that it may produce an undesirable aesthetic. Accordingly, there is a need for an improved rearview assembly.

SUMMARY

In accordance with the present disclosure, the disadvantages and problems associated with incorporating an electronic display element behind a mirror element in rearview assemblies of the past have been substantially reduced or eliminated.

In accordance with one aspect of the present disclosure, a rearview assembly is disclosed. The rearview assembly may be operable to provide a user with a view rearward a vehicle and comprise a first substrate, a second substrate, a first polarizer, and an arcuate profile. The first substrate may have a substantially planar first surface, a substantially planar second surface, and a first peripheral edge extending between the first and second surfaces. The first peripheral edge may, at least in part, have an arcuate profile. In some embodiments, the second surface may be larger than and disposed in the first direction relative the first surface. The second substrate may be disposed in a first direction relative the first substrate. Further, the second substrate may have a substantially planar third surface and a substantially planar fourth surface, and a second peripheral edge. The fourth surface may be larger than and disposed in the first direction relative the third surface. Additionally, the third and second surfaces may be substantially equal in size. The second peripheral edge may, at least in part, have an arcuate profile. The first polarizer may be disposed between the first substrate and the second substrate and have a third peripheral edge. Further, the first polarizer may be an absorptive polarizer. The arcuate profile may comprise the first, second, and/or third peripheral edges. Further, the arcuate profile may be a substantially smooth, continuous arc. In some embodiments, the arcuate profile may have a bullnose shape. Additionally, the arcuate profile may be along a plane perpendicular to the second surface.

In some embodiments, the rearview assembly may further comprise a third substrate, a liquid crystal medium, a first electrode, a second electrode, and a second polarizer. The third substrate may be disposed in the first direction and in a spaced apart relationship relative the second substrate. Additionally, the third substrate may be smaller than the second substrate. The liquid crystal medium may be disposed between the second and third substrates. Additionally, the liquid crystal medium may be operable between a first state and a second state. In the first state, the liquid crystal medium may substantially rotate a polarization of light transmitted therethrough. Accordingly, the liquid crystal medium may be a twisted nematic liquid crystal medium. Conversely, in the second state, the liquid crystal medium may transmit light therethrough without a substantial rotation of the polarization. The first electrode may be disposed in a second direction relative the liquid crystal medium. The second direction may be opposite the first direction. The second electrode may be disposed in the first direction relative the liquid crystal medium. The second polarizer may be disposed in the first direction relative the liquid crystal medium. Further, the second polarizer may be a reflective polarizer. Additionally, the second polarizer may be further disposed in the second direction relative the third substrate. In some embodiments, the rearview assembly may be operable between reflective and display states. Additionally, the rearview assembly may be operable between varying degrees of reflective intensity in a reflective state.

Further, the rearview assembly may comprise a housing. In some embodiments, the housing does not contain a bezel that extends onto the first substrate. Similarly, in some embodiments, the housing may not extend in the second direction beyond a plane extending from the second surface.

In some embodiments, the rearview assembly may further comprise a display. The display may be disposed in the first direction relative the second polarizer. Additionally, the display may operably be communicatively connected to a rearview camera of the vehicle and operable to display an image therefrom. Further, the display may be associated with at least one of the first substrate and/or the second polarizer.

Additionally, in some embodiments, the rearview assembly may further comprise a spectral filter. The spectral filter may be disposed in a peripheral manner and in a first direction relative the first electrode.

Various aspects of the present disclosure provide several advantages. Disposing and additional substrate in the second direction relative the absorptive polarizer enables a durable bezel-less design. A bezel-less design has the advantage of providing a more aesthetically pleasing design. Without disposing the absorptive polarizer in accordance with the above embodiments the absorptive polarizer may be disposed on front the surface. Accordingly, a rearview assembly without a bezel would expose an edge of the absorptive polarizer and make the absorptive polarizer susceptible to peeling. Therefore, contaminants, such as water, may get there behind and cause further degradation of the rearview assembly. Further, in such an arrangement, the absorptive polarizer is exposed and susceptible to damage via scratching and/or tearing.

These and other aspects, objects, and features of the present disclosure will be understood and appreciated by those skilled in the art upon studying the following specification, claims, and appended drawings. Further, features of

DETAILED DESCRIPTION

For the purposes of description herein, the specific devices and processes illustrated in the attached drawings and described in this disclosure are simply exemplary embodiments of the inventive concepts defined in the appended claims. Hence, specific dimensions and other physical characteristics relating the embodiments disclosed herein are not limiting, unless the claims expressly state otherwise.

Figure 1:
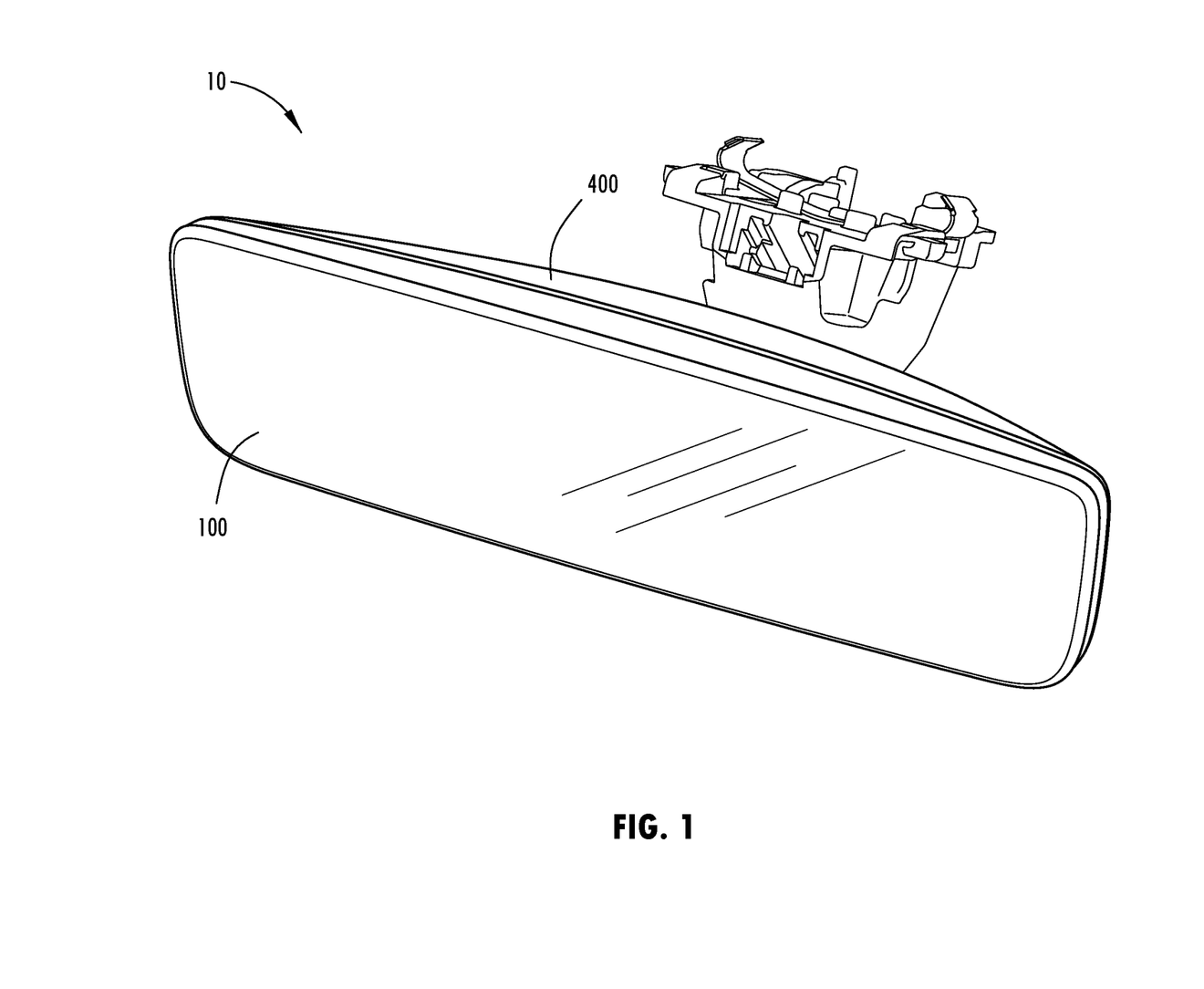
FIG. 1: Perspective view of a rearview assembly.

FIG. 1 is a perspective view of a rearview assembly 10. Further, FIGS. 2-8 are cross-sectional schematic representations of embodiments of rearview assembly 10. As merely schematic representations, some of the components have been distorted from their actual scales or shapes for pictorial clarity. Rearview assembly 10 may be implemented in a vehicle to provide a user 500 with a view of a rearward scene as well as configurable to provide user 500 with a desired image from a display. Rearview assembly 10 comprises an optical element 100 and a display element 200. Additionally, rearview assembly 10 may further comprise or be connected to a controller 300. In some embodiments, rearview assembly 10 may also comprise a housing 400.

Optical element 100 comprises a first substrate 110, a second substrate 120, a first electrode 130, a second electrode 140, a reflecting polarizer 150, an absorptive polarizer 160, a seal 170, and a liquid crystal medium 180. In some embodiments, optical element 100 may also comprise a spectral filter 190 and/or a third substrate 195. Further, optical element 100 may be operable between substantially transmissive and substantially reflective states.

Figure 2:
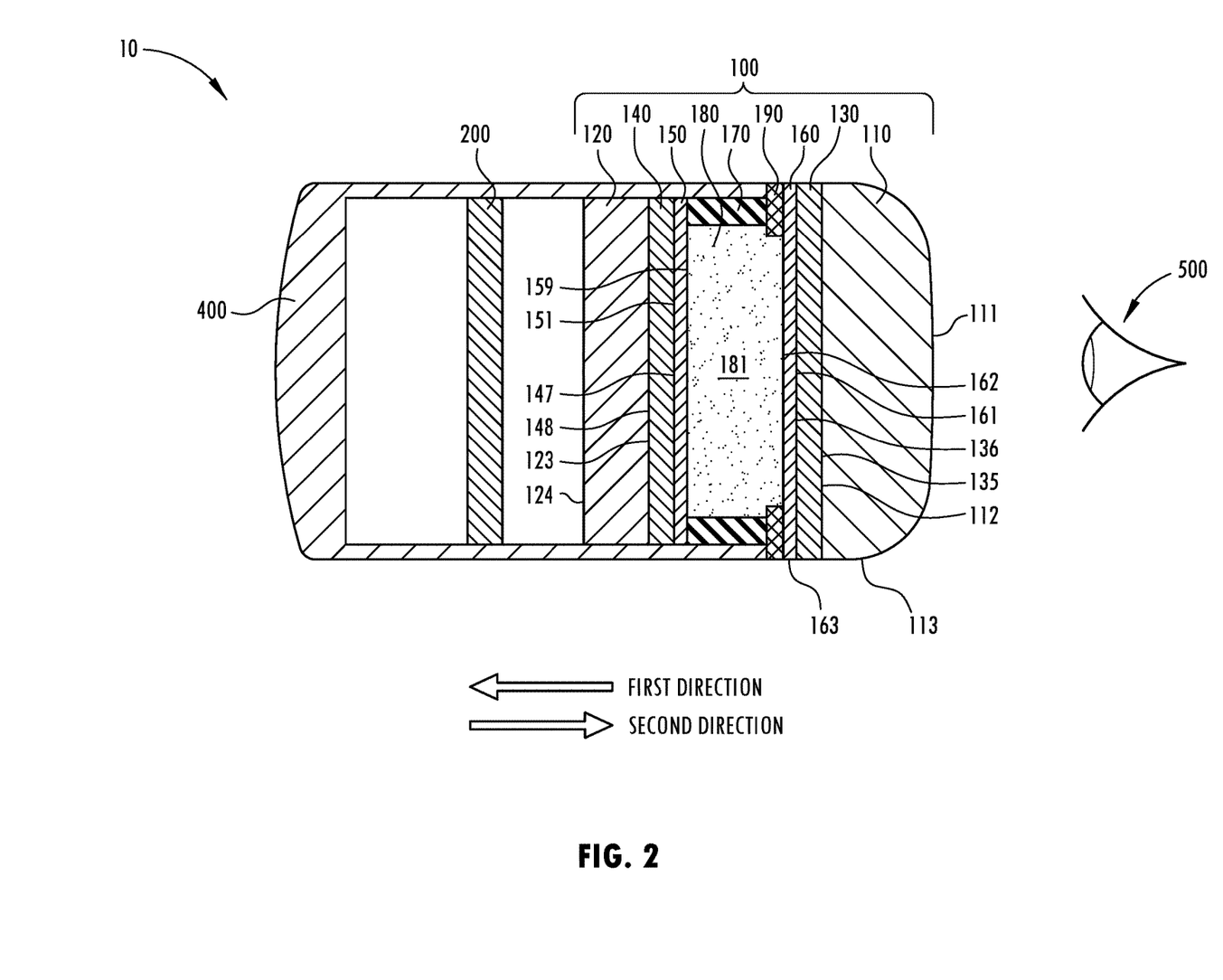
FIG. 2: Cross-sectional schematic representation of an embodiment of a rearview assembly.

First substrate 110 comprises a first surface 111, a second surface 112, and a first peripheral edge 113. Each of the first and the second surfaces 11, 112 may be substantially planar. Second surface 112 may be disposed in a first direction relative first surface 111. The first direction may be defined as a direction substantially perpendicular to the planar extent of first surface 111. First, peripheral edge 113 extends between the first and second surfaces 111, 112. Further, first substrate 110 may be fabricated from any one of a number of materials that are transparent or substantially transparent in the visible region of the electromagnetic spectrum, such as borosilicate glass, soda lime glass, float glass, natural and synthetic polymeric resins, plastics, and/or composites. While particular substrate materials are disclosed, numerous other substrate materials may likewise be used—so long as the materials are at least substantially transparent and exhibit appropriate physical properties such as strength and tolerance to conditions of the device's environment, such as temperature extremes and ultra-violet light exposure from the sun. Additionally, in some embodiments, as shown in FIG. 2, first peripheral edge 113 may be arcuate. In other words, the arcuate profile may be in a plane substantially perpendicular to the first and/or second surfaces 111, 112. Accordingly, first peripheral edge 113, at least in part, may have an arcuate profile in a plane extending along the first direction and/or a second direction. The second direction may be a direction substantially opposite the first direction. In some further embodiments, the arcuate profile may have a substantially bullnose shape. Accordingly, first surface 111 may be smaller than second surface 112.

Second substrate 120 comprises a third surface 123 and a fourth surface 124 and is disposed in a spaced apart relationship in the first direction relative first substrate 110. Second substrate 120 may be fabricated from similar materials as that of first substrate 110. Additionally, second substrate 120 may be generally the same size as or smaller than first substrate 110. In some embodiments where second substrate 120 is smaller than first substrate 110, all or part of a perimeter of second surface 112 may be un-occluded by second substrate 120 when viewed in the second direction.

First electrode 130 is electrically conductive and comprises a fifth surface 135 and a sixth surface 136. Sixth surface 136 may be disposed in the first direction relative fifth surface 135. Further, first electrode 130 may be substantially transparent in the visible region; bond reasonably well to a surface on which it is disposed on; be generally resistant to corrosion from materials contained within optical element 100; and exhibit minimal light diffusion or specular reflectance. First electrode 130, for example, may be a transparent conductive oxide, such as fluorine doped tin oxide, tin doped indium oxide, doped zinc oxide, or other materials known in the art.

Second electrode 140 is electrically conductive and comprises a seventh surface 147 and an eighth surface 148. Eighth surface 148 may be disposed in the first direction relative seventh surface 147. The electrically conductive material of second electrode 140 can be fabricated from similar materials as that of first electrode 130.

Reflective polarizer 150 is a polarization film operable to transmit light of a first polarization and reflect light of a second polarization. Reflective polarizer 150 comprises a ninth surface 159 and a tenth surface 151. Tenth surface 151 may be disposed in the first direction relative ninth surface 159. Further, reflective polarizer 150 may be electrically conductive. In embodiments where reflective polarizer 150 is electrically conductive, reflective polarizer 150 and second electrode 140 may be a single entity. Reflective polarizer 150 may be, a linear polarizer, an elliptical polarizer, or a circular polarizer. In some embodiments, reflective polarizer 150 may be a wire grid polarizer. Additionally, reflective polarizer 150 may include an optical retarder such as a quarter-wave plate or a half-wave plate. Moreover, reflective polarizer 150 may include a polymer-based film structure including at least one optically anisotropic layer. Such polymer-based film structure is generally referred as an antisotropic polymer-based film. Examples of antisotropic polymer-based films are provided by a multilayered polymer film, including a body of alternating layers of a crystallinebased polymer and another selected polymer, or by microstructured film-based polarizers, such as brightness enhancement films, or by dual brightness enhancement films.

Absorptive polarizer 160 is a polarization filter operable to transmit light of the first polarization and absorb light of the second polarization. Absorptive polarizer 160 comprises an eleventh surface 161 and a twelfth surface 162. Twelfth surface 162 may be disposed in the first direction relative eleventh surface 161. Additionally, absorptive polarizer 160 may further comprise a second peripheral edge 163. Further, absorptive polarizer 160 may be electrically conductive. In embodiments where absorptive polarizer 160 is electrically conductive, absorptive polarizer 160 and first electrode 130 may be a single entity.

First electrode 130, second electrode 140, reflecting polarizer 150, and/or absorptive polarizer 160 may be disposed relative first substrate 110, second substrate 120, and liquid crystal medium 180 in a number of configurations. Additionally, in some configurations, reflecting polarizer 150 and/or absorptive polarizer 160 is disposed between first substrate 110 and second substrate 120.

Seal 170 is disposed in a peripheral manner, between at least two of: first electrode 130, second electrode 140, reflecting polarizer 150, absorptive polarizer 160, and spectral filter 190, to define a chamber 181 with at least two thereof. Seal 170 may comprise any material capable of being adhesively bonded to two or more of: first electrode 130, second electrode 140, reflective polarizer 150, absorptive polarizer 160, and spectral filter 190 to in turn seal chamber 181, such that a liquid crystal medium 180 does not substantially leak therefrom. Further, seal 170 may have low permeabilies for oxygen and moisture vapor, as well as little to no reactivity with species disposed in chamber 181, such as liquid crystal medium 180.

Liquid crystal medium 180 may be any substantially transparent medium operable to switch between first and second states. For example, liquid crystal medium 180 may be a twisted nematic liquid crystal medium. Further, liquid crystal medium 180 is disposed in chamber 181. Accordingly, liquid crystal medium 180 is disposed between first substrate 110 and second substrate 120. In a first state, liquid crystal medium 180 substantially rotates a polarization of light transmitting therethrough. In a second state, the medium does not substantially rotate a polarization of light transmitting therethrough. The second state may correspond to an electric field being applied though liquid crystal medium 180. Conversely, the second state may correspond to the absence of an electric field being applied through liquid crystal medium 180. Additionally, liquid crystal medium 180 may be operable to enter the first and second states to varying degrees based on properties of the electric field.

In some embodiments, optical element 100 may also comprise spectral filter 190. Spectral filter 190 is generally opaque and disposed between first substrate 110 and seal 170 in a peripheral manner. Additionally, spectral filter 190 may be reflective. Accordingly, spectral filter 190 may incorporate a hiding layer such as a chrome ring or other similar finish to conceal things generally disposed there behind when observed by user 500 disposed in the second direction relative rearview assembly 10 and looking at optical element 100. Spectral filter 190 may be associated with at least one of second surface 112, fifth surface 135, sixth surface 136, eleventh surface 161, and twelfth surface 162.

Figure 3:
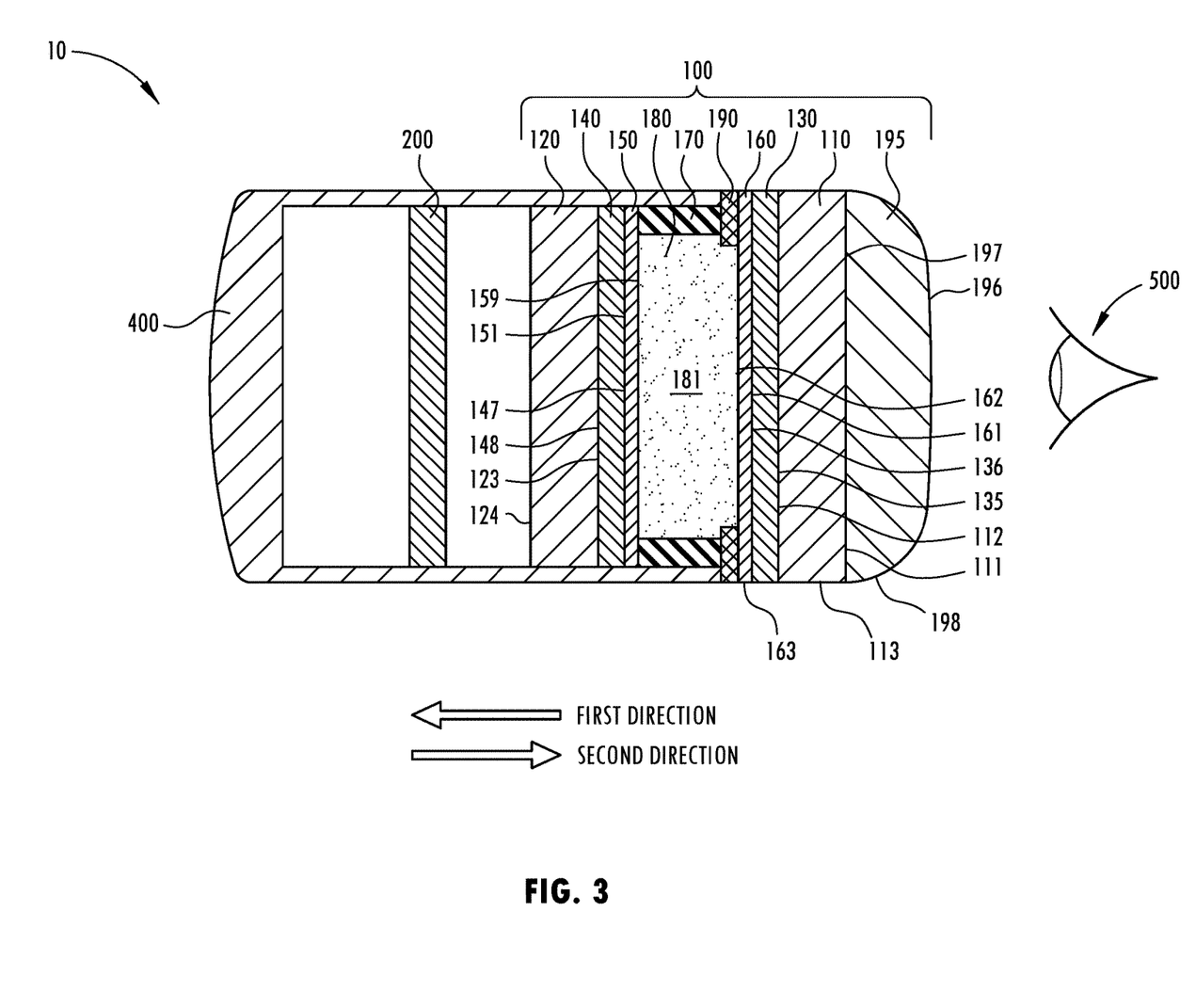
FIG. 3: Cross-sectional schematic representation of an embodiment of a rearview assembly.
Figure 4:
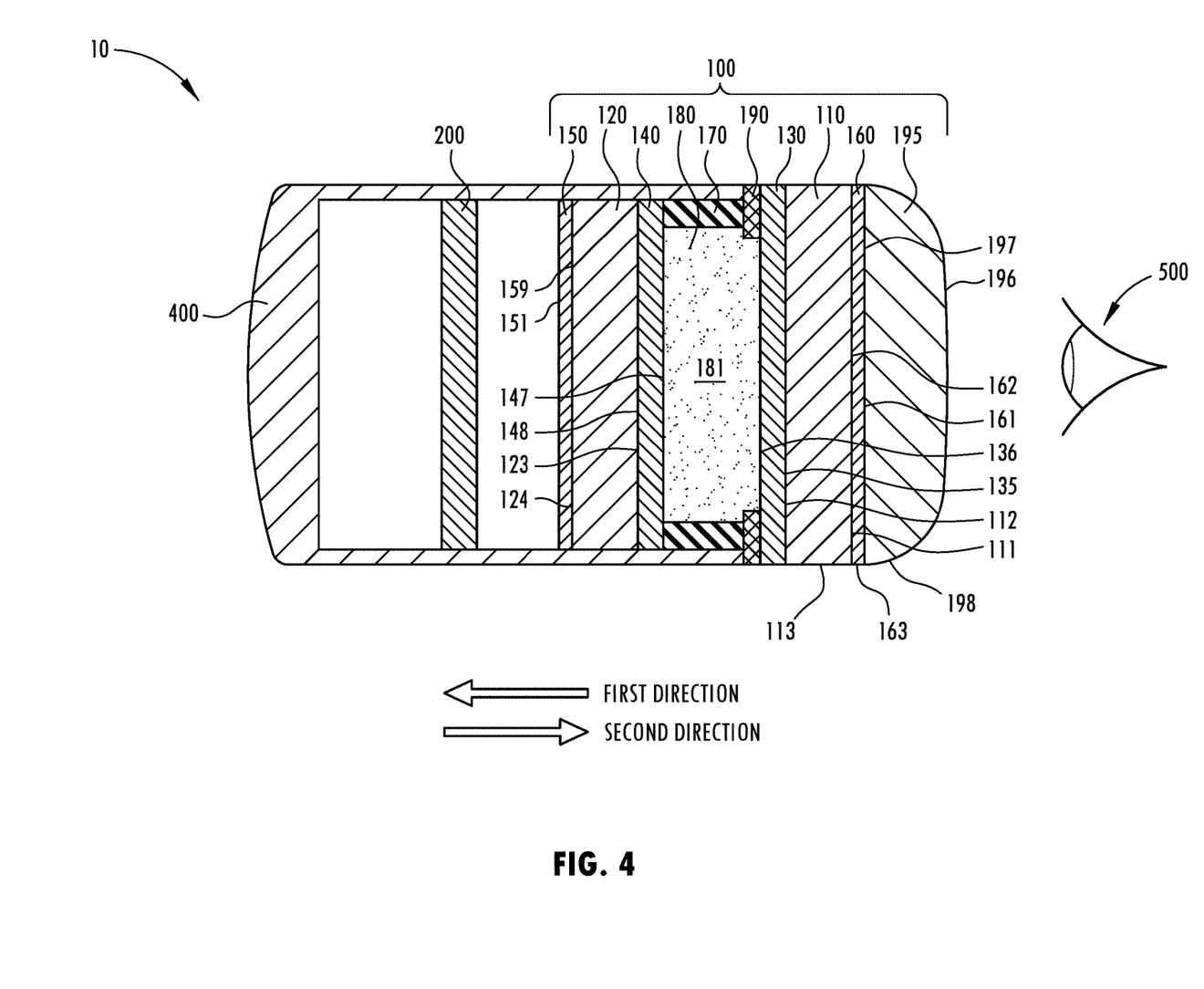
FIG. 4: Cross-sectional schematic representation of an embodiment of a rearview assembly.

In some embodiments, optical element 100 may comprise third substrate 195, as shown in FIGS. 3-4. Third substrate 195 comprises a thirteenth surface 196, a fourteenth surface 197, and a third peripheral edge 198. Each of the thirteen and fourteenth surfaces 196, 197 may be substantially planar. Fourteenth surface 197 may be disposed in the first direction relative thirteenth surface 196. Third peripheral edge 198 extends between the thirteenth and fourteenth surfaces 196, 198. Additionally, third peripheral edge 198 may, at least in part, be arcuate. Accordingly, third peripheral edge 198 may, at least in part, have an arcuate profile in a plane extending in the first and/or second directions. In embodiments, as shown in FIG. 3, third peripheral edge 198 having an arcuate profile may be exclusive of first peripheral edge 113 having an arcuate profile. In some embodiments, the arcuate profile may have a bullnose shape. Therefore, fourteenth surface 197 may be smaller than thirteenth surface 196. For example, arcuate profile may have a radius of 2.5 mm or thereabout. Further, third substrate 195 may be fabricated from similar materials as that of first substrate 110. Additionally, third substrate 195 is disposed in the second direction relative first substrate 110. In some embodiments, fourteenth surface 197 of third substrate 195 may be associated with first surface 111 of first substrate 110, as shown in FIG. 3. In other embodiments, fourteenth surface 197 of third substrate 195 may be associated with eleventh surface 161 of absorptive polarizer 160, as shown in FIG. 4.

Figure 5:
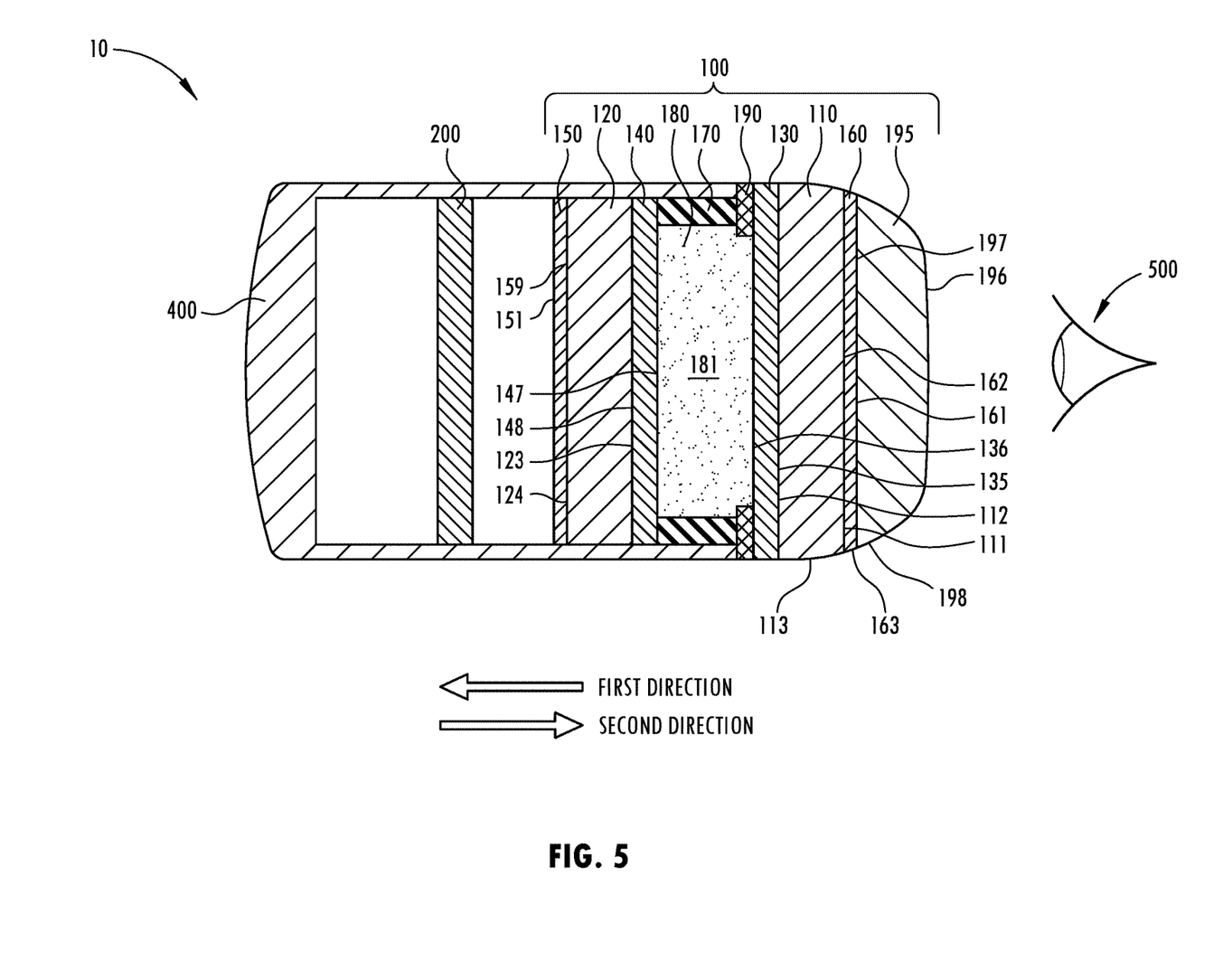
FIG. 5: Cross-sectional schematic representation of an embodiment of a rearview assembly.

In some embodiments, as further shown in FIG. 5, each of the first and second peripheral edges 113, 198 may, at least in part, comprise an arcuate profile in a plane extending in the first and/or second directions. In such an embodiment, the profiles of the first and second peripheral edges 113, 198 may substantially comprise a combined arcuate profile of electro-optic element 100. The combined arcuate profile may be substantially continuous relative the first and second peripheral edges 113, 198. Therefore, in some embodiments, the combined arcuate profile comprises the first peripheral edge 113, the second peripheral edge 163, and/or the third peripheral edge 198. Accordingly, second surface 112 may be larger than first surface 111, first surface 111 may be substantially equal to or greater than fourteenth surface 197 in size, fourteenth surface 197 may be larger than thirteen surface 196. Additionally, tenth surface 151 may be larger than or substantially equal to ninth surface 159 in size. Accordingly, second surface 112 may be larger than first surface 111, first surface 111 may be substantially equal to or greater than fourteenth surface 197 in size, fourteenth surface 197 may be larger than thirteen surface 196. Thus, the combined arcuate profile may form a substantially continuous arc comprising the first, second, and third peripheral edges 113, 163, 198.

First electrode 130, second electrode 140, reflective polarizer 150, and absorptive polarizer 160 may be disposed relative one another in a number of configurations. Possible locations for these elements are provided as follows. The locations for each of these elements may be selected from any of those provided and arranged with other elements having any selected location of those provided to achieve numerous arrangements.

Liquid crystal medium 180 may be disposed between the first and second substrates 110, 120. First electrode 130 may be disposed between liquid crystal medium 180 and first substrate 110. Accordingly, fifth surface 135 may be associated with second surface 102. Similarly, second electrode 140 may be disposed between liquid crystal medium 180 and second substrate 120. Accordingly, eighth surface 148 may be associated with third surface 123. In some embodiments, one or both of reflective polarizer and absorptive polarizer 160 may be disposed outside of the first and second substrates 110, 120. In other embodiments, one or both of reflective polarizer 150 and absorptive polarizer 160 may be disposed between first substrate 110 and second substrate 120.

Figure 6:
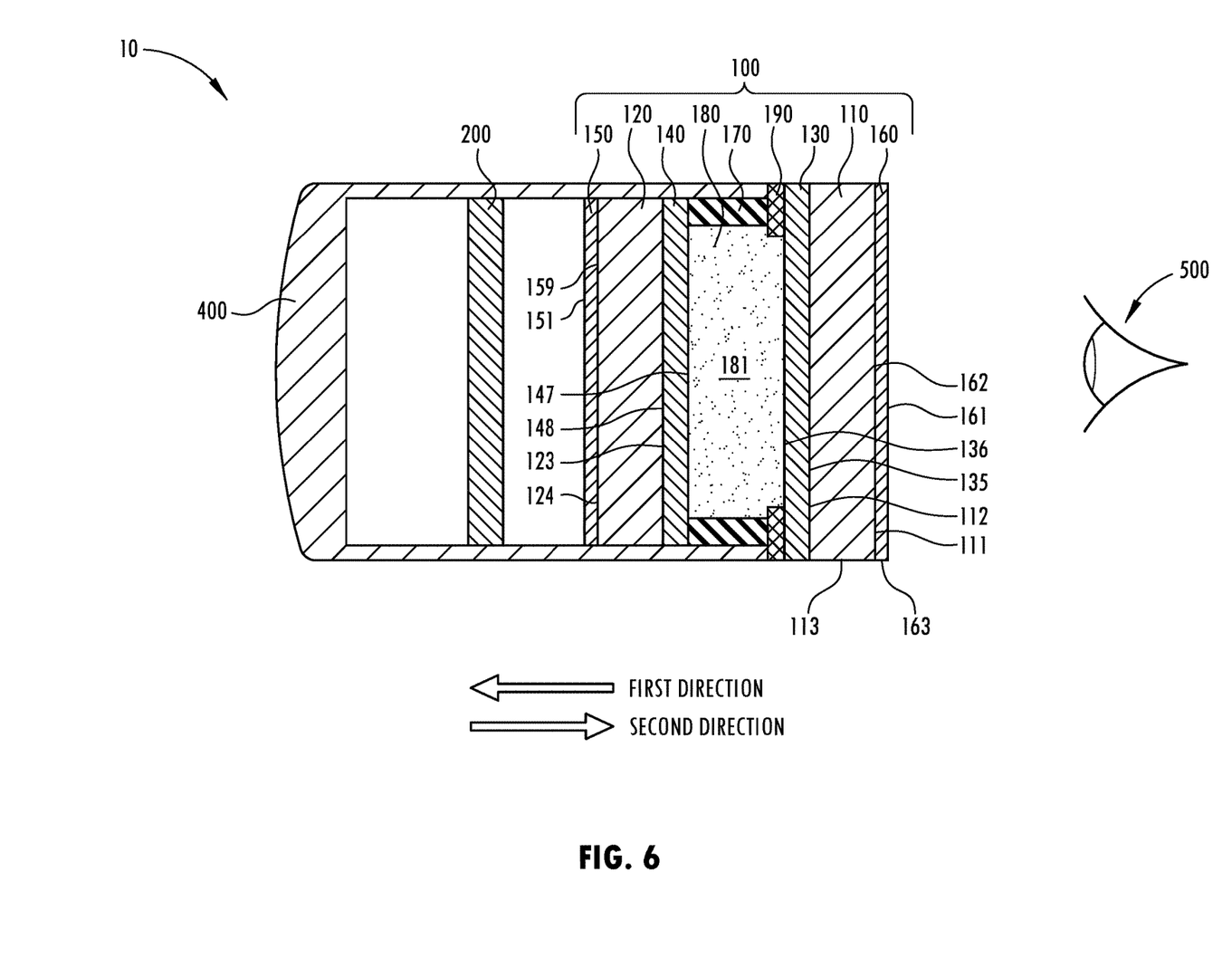
FIG. 6: Cross-sectional schematic representation of an embodiment of a rearview assembly.

In embodiments where reflective polarizer 150 is disposed outside of the first and second substrates 110, 120, as shown in FIG. 6, reflective polarizer 150 is disposed in the first direction relative second substrate 120. Accordingly, ninth surface 159 may be associated with fourth surface 124.

Figure 7:
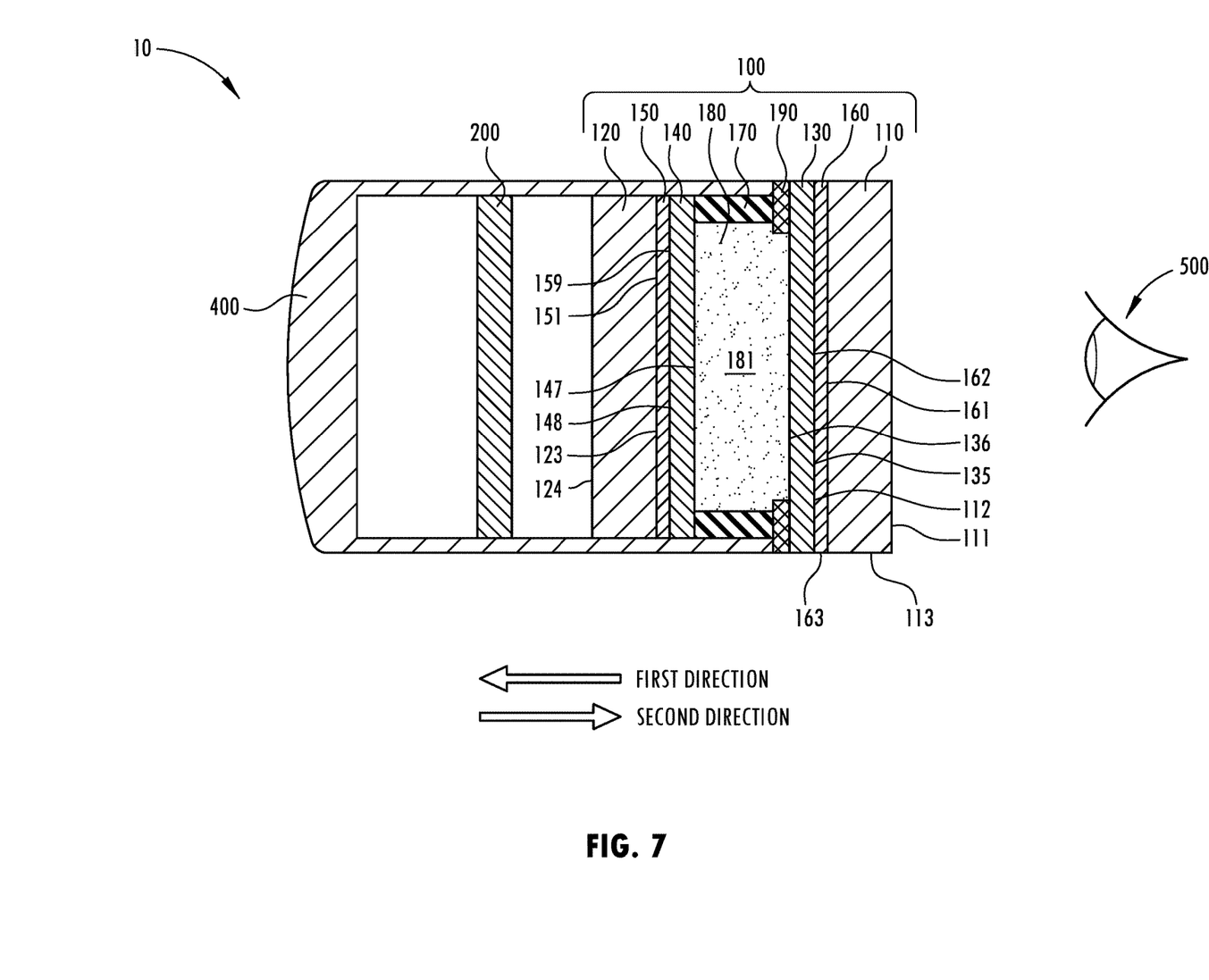
FIG. 7: Cross-sectional schematic representation of an embodiment of a rearview assembly.
Figure 8:
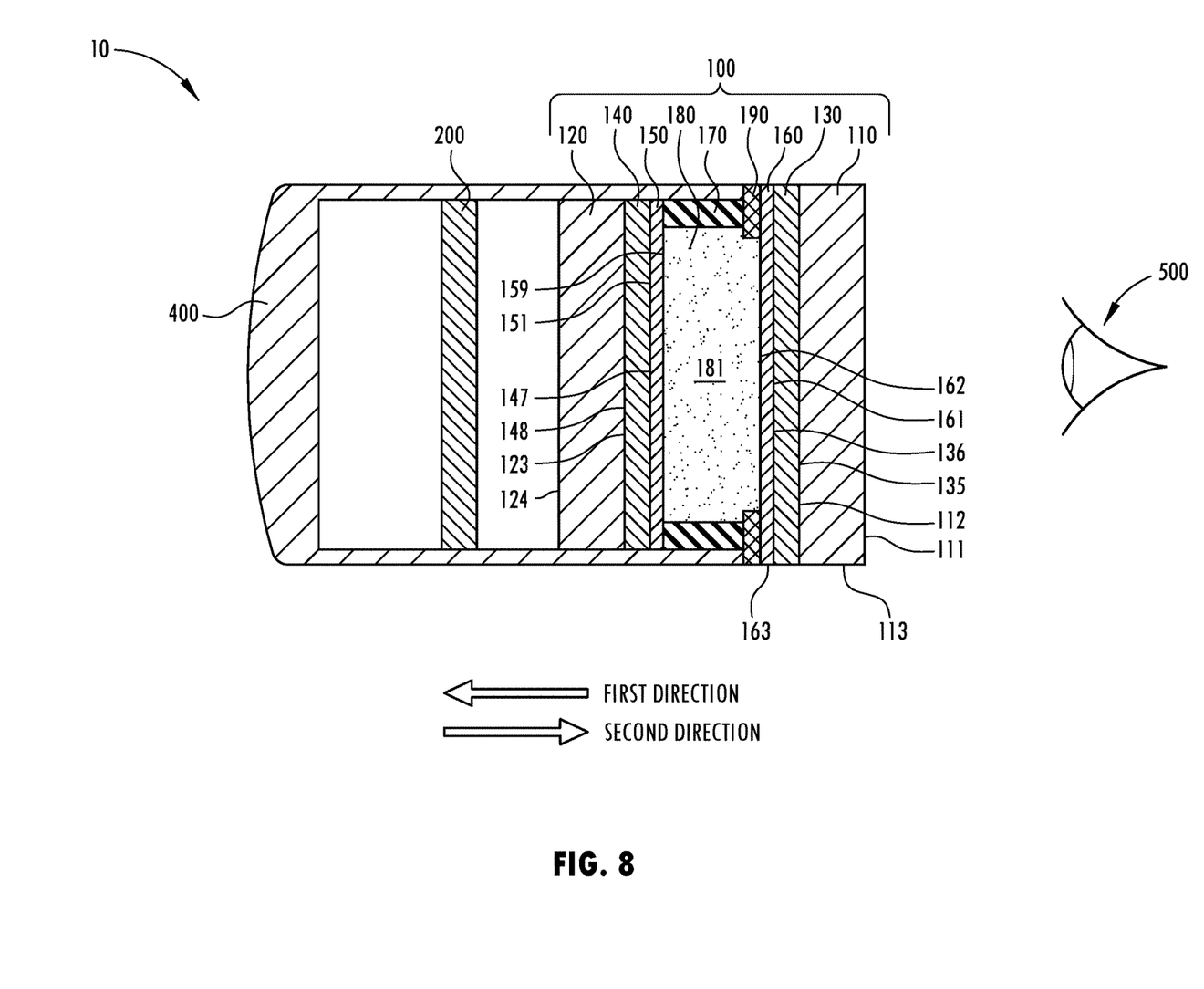
FIG. 8: Cross-sectional schematic representation of an embodiment of a rearview assembly.

In embodiments where reflective polarizer 150 is disposed between first substrate 110 and second substrate 120, reflective polarizer 150 is disposed in the second direction relative second substrate 120 and the first direction relative liquid crystal medium 180, as shown in FIGS. 7-8. In other words, reflective polarizer 150 may be disposed between second substrate 120 and liquid crystal medium 180. Additionally, as shown in FIG. 7, reflective polarizer 150 may be further disposed in the first direction relative second electrode 140. In other words, reflective polarizer 150 may be disposed between second substrate 120 and second electrode 140. In such an embodiment, tenth surface 151 may be associated with third surface 123. Further, ninth surface 159 may be associated with eighth surface 148. Alternatively, as shown in FIG. 8, reflective polarizer 150 may be disposed in the second direction relative second electrode 140. In other words, reflective polarizer 150 may be disposed between second electrode 140 and liquid crystal medium 180. In such an embodiment, tenth surface 151 may be associated with seventh surface 147.

In embodiments where absorptive polarizer 160 is disposed outside of the first and second substrates 110, 120, as shown in FIG. 6, absorptive polarizer 160 may be disposed in the second direction relative first substrate 110. Accordingly, twelfth surface 162 may be associated with first surface 111. In such embodiments where absorptive polarizer 160 may be disposed in the second direction relative first substrate 110, third substrate 195, when present, may be further disposed in the second direction relative absorptive polarizer 160, as shown in FIGS. 4-5. In other words, absorptive polarizer 160 may be disposed between first substrate 110 and third substrate 195. Accordingly, in some embodiments, twelfth surface 162 may be associated with first surface 111 and/or fourteenth surface 197 may be associated with eleventh surface 161.

In embodiments where absorptive polarizer 160 is disposed between first substrate 110 and second substrate 120, absorptive polarizer 160 is disposed in the first direction relative first substrate 110 and the second direction relative liquid crystal medium 180, as shown in FIGS. 7-8. In other words, absorptive polarizer 160 may be disposed between first substrate 110 and liquid crystal medium 180. Additionally, as shown in FIG. 7, absorptive polarizer 160 may be further disposed in the second direction relative first electrode 130. In other words, absorptive polarizer 160 may be disposed between first substrate 110 and first electrode 130. In such an embodiment, eleventh surface 161 may be associated with second surface 112. Further, twelfth surface 162 may be associated with the fifth surface 135. Alternatively, as shown in FIG. 8, absorptive polarizer 160 may be disposed in the first direction relative first electrode 130. In other words, absorptive polarizer 160 may be disposed between first electrode 130 and liquid crystal medium 180. In such an embodiment, eleventh surface 161 may be associated with sixth surface 136.

Spectral filter 190 may be disposed between first substrate 110 and liquid crystal medium 180. Accordingly, spectral filter 190 may be disposed in the first direction relative first substrate 110 and in the second direction relative liquid crystal medium 180. Additionally, spectral filter 190 may be further disposed between any two of liquid crystal medium 180, absorptive polarizer 160, first electrode 120, and first substrate 110.

Display element 200 may be any device operable to display a digital image. The digital image may be captured by the vehicle's rearview camera. Display element 200 may be LCD, LED, OLED, micro LED, plasma, DLP, or other technology. Further, display element 200 is disposed in the first direction relative optical element 100. Additionally, display element 200 may be smaller than first substrate 110 and/or approximately equal in size to second substrate 120. Further, display element 200 may be disposed in a spaced apart relationship with or associated with or in abutting contact with optical element 100, such that the image displayed by display element 200 may be viewed through optical element 100 by user 500. Accordingly, display element 200 may be associated with seconds substrate 120 and/or reflective polarizer 140.

Figure 9:
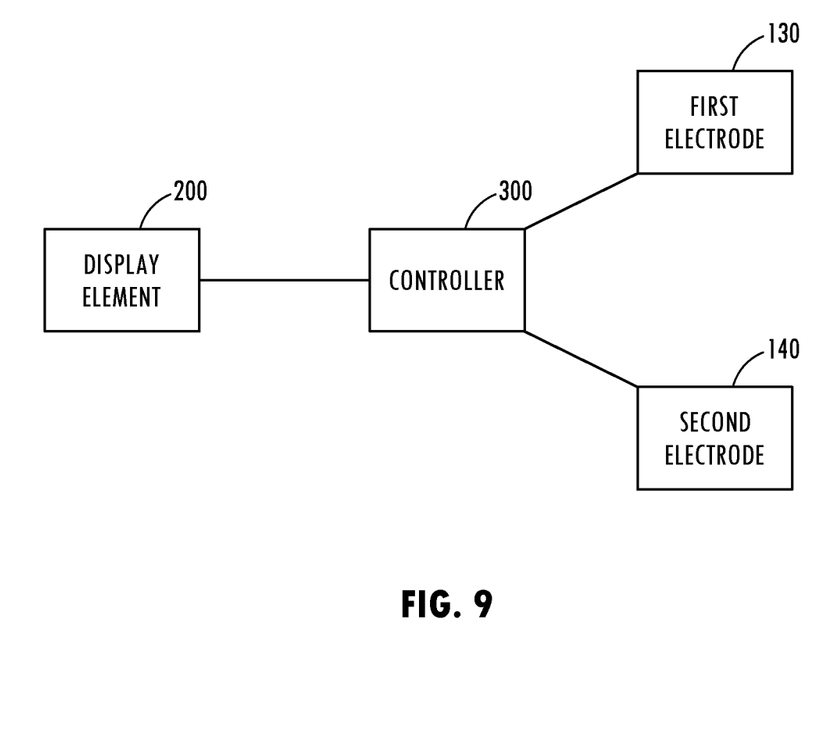
FIG. 9: Schematic representation of a controller's connection to one or more elements of a rearview assembly.

As shown in FIG. 9, rearview assembly 10 may further comprise or be connected to controller 300. Controller 300 is electrically connected to the first and second electrodes 130, 140 and may be any device operable to deliver an electrical potential thereto. In some embodiments, controller 300 may also be communicatively connected to display element 200. In embodiments where controller 300 is communicatively connected to display element 200, controller 300 may be operable to turn display element 200 on and off or transmit a digital image—such as a digital image captured by a rearview camera—to display element 200 for display.

In some embodiments, rearview assembly 10 may further comprise housing 400. Housing 400 may be bezel-less. Additionally, housing 400 defines a cavity having an opening in the second direction thereof. Display element 200 may be disposed within the cavity. Further, housing 400 may make abutting contact with optical element 100, partially encompass optical element 100, or completely encompass optical element 100. In some embodiments, housing 400 may extend around a portion of optical element 100 such that housing 400 does not extend onto first surface 111 of first substrate 110. In other embodiments, housing 400 may extend around a portion of optical element 100 such that housing 400 does not extend onto edge 113 of first substrate 110. Accordingly, in some embodiments, housing 400 may not extend in the second direction beyond a plane extending from first surface 111. In other words, housing 400 may not break a plane extending from first surface 111. In other embodiments, housing 400 may not extend in the second direction beyond a plane extending from second surface 112. In other words, housing 400 may not break a plane extending from second surface 112. Similarly, in some embodiments, that housing 400 does not extend onto edge 198 of third substrate 195. Accordingly, in some embodiments, housing 400 may not extend in the second direction beyond a plane extending from thirteenth surface 196. In other words, housing 400 may not break a plane extending from thirteenth surface 196. In other embodiments, housing 400 may not extend in the second direction beyond a plane extending from fourteenth surface 197. In other words, housing 400 may not break a plane extending from fourteenth surface 197. In some embodiments, the abutting contact may be made with the perimeter of second surface 112 un-occluded by second substrate 120.

In operation, rearview assembly 10 is switchable between two states: a reflective state and a display state. The state of rearview system 10 is determined by the presence of an electric field created from an electrical potential between first electrode 130 and second electrode 140 and the orientations of reflective polarizer 150 and absorptive polarizer 160. In the examples below, the transmission axes of the two polarizers may be parallel to each other. In some embodiments, the transmission axes may be vertically aligned. However, rearview assembly 10 would work at any orientation transmission axes orientation. Additionally, the angle of light emitted by the display may be aligned with the transmission axis of reflective polarizer 150. Further, in the first state, liquid crystal medium 180 may rotate light polarization by 90 degrees.

In a reflective state, little or no electrical potential is applied between first electrode 130 and second electrode 140. As a result of the lack of electrical potential, the electrical field is minimal or non-existent and therefore liquid crystal medium 180 is in the first state. In the first state, liquid crystal medium 180 rotates a polarization of light transmitted therethrough.

Accordingly, in a reflective state, light comprising a mixture of polarizations entering optical element 100, from the second direction, may transmit through first substrate 110 and first electrode 130. However, when the light encounters absorptive polarizer 160, light having a first polarization is substantially transmitted therethrough and light having a second polarization is substantially absorbed. Thereafter, the light of the first polarization transmits through liquid crystal medium 180 and is rotated to the second polarization. The light of the second polarization then encounters reflective polarizer 150. Reflective polarizer 150 substantially reflects light of the second polarization. Therefore, the light of the second polarization range is reflected back into liquid crystal medium 180 where it is rotated back to the first polarization and, subsequently, is transmitted through absorptive polarizer 160, first electrode 130, and first substrate 110. Accordingly, rearview assembly 10 in the reflective state operates as a mirror and the light reflected therefrom may be viewed by a user 500.

Further, rearview assembly 10 may enter the reflective state to varying degrees of reflective intensity. Accordingly, rearview assembly 10 may enter a dimmed reflective state. A dimmed reflective state is enabled by varying the electrical potential across first electrode 130 and second electrode 140, which changes the angular orientation of the liquid crystal molecules relative to the transmission axis of absorptive polarizer 160. As the electric field is varied form 0 to 3 V, for example, the liquid crystal molecules may rotate the direction of polarization by 90 degrees, partially rotate the direction of polarization, or not change the direction of polarization and thereby vary the intensity of the reflective polarizer. This effectively may vary the total quantity of light that is reflected toward user 500. For example, an electrical potential between first electrode 130 and second electrode 140 of 3.0 V may result in a liquid crystal medium that does not change light polarization, while an electrode potential of 2.5 V may partially change the direction of polarization.

In a display state, an electrical potential is applied between first electrode 130 and second electrode 140. As a result of the electrical potential, an electrical field is created that passes through liquid crystal medium 180. Therefore, liquid crystal medium 180 is in the second state. In the second state, liquid crystal medium 180 allows light to transmit therethrough without a rotation of polarization.

Accordingly, in the display state, display 200 emits light to produce an image. The emitted light passes through the second substrate 120 and second electrode 140. When the emitted light encounters reflective polarizer 150, light of the first polarization transmits therethrough. Thereafter, the emitted light of the first polarization transmits through liquid crystal medium 180 where it transmits therethrough without a rotation of polarization. The light then transmits through reflective polarizer 150 as it is of the first polarization. Further, the light is transmitted by first electrode 130 and first substrate 110. Accordingly, rearview assembly 10 in the display state operates as a display and the light comprising the image is projected in the second direction and may be viewed by user 500.

Various aspects of the present disclosure enable a rearview assembly 10 having several advantages. Many of the advantages are specifically enabled by disposing at least one of reflecting polarizer 150 and absorptive polarizer 160 between first substrate 110 and second substrate 120 or adding third substrate 195 in the second direction relative first substrate 110.

First, disposing absorptive polarizer 160 between first substrate 110 and second substrate 120 or between first substrate 110 and third substrate 195 enables a durable bezel-less design. A bezel-less design may correspond to a construction where housing 400 does not extend onto first surface 111 and/or edge 113. The bezel-less design may have the advantage of providing a more aesthetically pleasing design. Without disposing absorptive polarizer 160 between first substrate 110 and second substrate 120 or between first substrate 110 and third substrate 195, absorptive polarizer 160 is disposed on a front surface of rearview assembly. The front surface may be the surface of rearview assembly 10 furthest in the second direction. The front surface, in some instances, may be first surface 111. In such an embodiment where absorptive polarizer 160 is disposed on the front surface, eliminating a bezel exposes an edge of absorptive polarizer 160 and makes absorptive polarizer 160 susceptible to peeling from the front surface. Therefore, contaminants, such as water, may get there behind and cause further degradation of rearview assembly 10. Further, absorptive polarizer 160 is exposed and susceptible to damage via scratching and/or tearing.

Second, disposing absorptive polarizer 160 between first substrate 110 and second substrate 120 or between first substrate 110 and third substrate 195 enables the front substrate to have an arcuate third peripheral edge 198. Accordingly, first, second, and/or third peripheral edges 113, 163, 198 may have arcuate profiles. Typically, these edges could not be arcuate because absorptive polarizer 160 typically cannot conform to the complex shapes created by the peripheral bevel. Accordingly, a rearview assembly 10 with reduced sharp edges and an improved aesthetic is enabled.

Third, distances between spectral filter 190 and a polarizer may produce a shadow effect. The effect of is increasingly prevalent at increasing distances. Accordingly, disposing at least one of reflecting polarizer 150 and absorptive polarizer 160 between first substrate 110 and second substrate 120, reduces or minimizes this distance and therefore any shadow.

In this document, relational terms, such as "first," "second," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

The terms "including," "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises a . . . " does not, without more constraints, preclude the existence of additional identical elements in the process, method, article, or apparatus that comprises the elements.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A rearview assembly comprising:
    a first substrate having a first peripheral edge;
    a second substrate disposed in a first direction relative the first substrate, the second substrate having a second peripheral edge;
    a first polarizer disposed between the first substrate and the second substrate, the polarizer having a third peripheral edge;
    an arcuate profile extending in the first direction through the first substrate, the first polarizer, and at least a portion of the second substrate, wherein the arcuate profile extends through at least a portion of the first peripheral edge, the second peripheral edge, and the third peripheral edge; and
    wherein the rearview assembly is operable to provide a user with a view rearward of a vehicle.

2. The rearview assembly of claim 1, further comprising:
    a third substrate disposed in the first direction and in a spaced apart relationship relative the second substrate;
    a liquid crystal medium disposed between the second and third substrates, the liquid crystal medium operable between:
        a first state wherein the liquid crystal medium substantially rotates a polarization of light transmitted therethrough, and
        a second state wherein the liquid crystal medium transmits light therethrough without a substantial rotation of the polarization;
    a first electrode disposed in a second direction relative the liquid crystal medium, the second direction opposite the first direction;
    a second electrode disposed in the first direction relative to the liquid crystal medium; and
    a second polarizer disposed in the first direction relative to the liquid crystal medium.

3. The rearview assembly of claim 1, wherein the arcuate profile is a substantially smooth, continuous arc.

4. The rearview assembly of claim 1, wherein the arcuate profile is of a bullnose shape.

5. The rearview assembly of claim 1, further comprising a housing that does not contain a bezel that extends onto the first substrate.

6. The rearview assembly of claim 1, wherein the first substrate has a substantially planar first surface and a substantially planar second surface, the second surface larger than and disposed in the first direction relative to the first surface.

7. The rearview assembly of claim 1, wherein the second substrate has a substantially planar first surface and a substantially planar second surface, the second surface larger than and disposed in the first direction relative to the first surface.

8. The rearview assembly of claim 2, wherein the third substrate is smaller than the second substrate.

9. The rearview assembly of claim 1, wherein:
    the second substrate has a first surface and a second surface; and
    the arcuate profile is along a plane perpendicular to the second surface.

10. The rearview assembly of claim 1, further comprising a housing, wherein:
    the second substrate has a first surface and a second surface, the second surface disposed in the first direction relative to the first surface; and
    the housing does not extend in the second direction beyond a plane extending from the second surface.

11. The rearview assembly of claim 1, wherein the first polarizer is an absorptive polarizer.

12. The rearview assembly of claim 2, wherein the second polarizer is a reflective polarizer.

13. The rearview assembly of claim 2, wherein the second polarizer is further disposed in the second direction relative to the third substrate.

14. The rearview assembly of claim 2, further comprising a display disposed in the first direction relative to the second polarizer.

15. The rearview assembly of claim 14, wherein the rearview assembly is operable between a reflective state and a display state.

16. The rearview assembly of claim 15, wherein the rearview assembly is operable between varying degrees of reflective intensity in a reflective state.

17. The rearview assembly of claim 1, wherein the first polarizer has a first surface and a second surface, the second surface disposed in the first direction relative to the first surface and the second surface larger than the first surface.

18. The rearview assembly of claim 1, further comprising a spectral filter disposed in a peripheral manner and in the first direction relative to the first electrode.

19. A rearview assembly comprising:
a first substrate having a first peripheral edge defining a perimeter of a viewing surface of the rearview assembly;
a second substrate disposed in a first direction relative to the first substrate, the second substrate having a second peripheral edge;
a first polarizer disposed between the first substrate and the second substrate, the polarizer having a third peripheral edge;
wherein an arcuate profile extends in the first direction from the viewing surface through the first perimeter edge of the first substrate, the third peripheral edge of the first polarizer, and the second peripheral edge of at least a portion of the second substrate, such that each of the first peripheral edge, the second peripheral edge, and the second peripheral edge increase along an outer edge of the rearview assembly; and
wherein the rearview assembly is operable to provide a user with a view rearward a vehicle.

20. The rearview assembly according to claim 18, wherein a taper of the arcuate profile in the first direction extends through the first peripheral edge and the second peripheral edge, and wherein the second peripheral edge extends beyond the first peripheral edge perpendicular to the first direction in the direction of the taper.

\* \* \* \* \*

UNITED STATES PATENT AND TRADEMARK OFFICE
CERTIFICATE OF CORRECTION

PATENT NO. : 11,932,170 B2
APPLICATION NO. : 17/076319
DATED : March 19, 2024
INVENTOR(S) : Niu et al.

Page 1 of 1

It is certified that error appears in the above-identified patent and that said Letters Patent is hereby corrected as shown below:

In the Claims

Column 11, Line 66 (second occurrence), after "the" insert --first--; and

Column 14, Line 10, "second" should be --third--.

Signed and Sealed this
Twenty-eighth Day of May, 2024

*Katherine Kelly Vidal*

Katherine Kelly Vidal
*Director of the United States Patent and Trademark Office*